United States Patent [19]

Henriksson

[11] 4,375,354

[45] Mar. 1, 1983

[54] BAKERY OVEN AND AN OVEN CART RECEIVED THEREIN

[75] Inventor: Roy Henriksson, Brämhult, Sweden

[73] Assignee: Elektro-Dahlen AB, Boras, Sweden

[21] Appl. No.: 267,702

[22] Filed: May 27, 1981

[30] Foreign Application Priority Data

May 30, 1980 [SE] Sweden .............................. 8004036

[51] Int. Cl.³ .......................... F27D 3/00; A23L 3/00; A23B 4/04; F27D 3/12

[52] U.S. Cl. ................................ 432/239; 99/443 R; 99/479; 432/137; 432/138; 432/241

[58] Field of Search ............... 432/137, 138, 239, 241; 99/443 R, 479

[56] References Cited

U.S. PATENT DOCUMENTS

| | | | |
|---|---|---|---|
| 1,543,596 | 6/1925 | Brand | 99/479 |
| 1,950,292 | 3/1934 | Brand | 99/479 |

FOREIGN PATENT DOCUMENTS

| | | | |
|---|---|---|---|
| 2422186 | 11/1975 | Fed. Rep. of Germany | 126/21 A |
| 124755 | 3/1928 | Switzerland | 432/239 |
| 1103953 | 2/1968 | United Kingdom | 99/443 R |

Primary Examiner—John J. Camby
Attorney, Agent, or Firm—Holman & Stern

[57] ABSTRACT

A bakery oven for food preparation and an oven cart which can be placed therein comprising a goods stand (1) a wheel provided cart underframe (2), an oven chamber (5) in which the goods stand (1) is intended to be received, and a second chamber (15) arranged under the floor (14) of the oven chamber, the cart undersection (2) being pushed into said second chamber when the oven cart is rolled into the oven. The goods stand is rotatable relative to the cart underframe and the oven cart is provided with a coupling member (7), which cooperates with a rotatable driving device (8) in the oven. The goods stand is supported on the cart underframe by a vertical axle (13) rotatably mounted therein and an attachment (12) arranged at the end of the axle. A slot (16) which is open towards the oven door is arranged in the floor (14) of the oven chamber for receiving the axle (13). During the rotation of the goods stand in the oven chamber (5) the cart underframe is stationary in the cart chamber (15) and is thereby not exposed to the strong heat in the oven chamber.

7 Claims, 7 Drawing Figures

BAKERY OVEN AND AN OVEN CART RECEIVED THEREIN

BACKGROUND OF THE INVENTION

1. Field of the Invention

The present invention refers to a bakery oven and an oven cart which can be placed therein of the kind comprising a cart underframe and a goods bakery stand which is rotatable in relation thereto about a vertical axial line. A coupling member is arranged in the oven chamber to cooperate with a driving means for rotating the bakery goods stand and a chamber for the cart underframe is arranged under the oven chamber floor in the oven.

2. Description of the Prior Art

Oven carts are arranged to support bakery goods or other products on trays or grills, which are placed above each other on supports at the sides of the cart. The oven cart is placed inside an oven where it either is stationary or rotating. For rotating the oven cart it is either suspended in a rotatable supporting means in the roof of the oven or else it rests on a rotating plate on the floor of the oven. Both alternatives have disadvantages.

In order to achieve a connection of the oven cart and the supporting means in the roof of the oven a lifting arrangement is needed which of course means a complication. It is also of great importance to have the goods evenly distributed on the oven cart for avoiding uneven loads.

A disadvantage with ovens having a rotating plate in the floor is that there is great difficulty in cleaning the oven satisfactorily, since it is in this case necessary to lift up the plate, which is heavy and inconvenient.

In the Swedish patent application No. 7806873-1 (publication No. 412,037, dated Feb. 18, 1980) an oven cart is known, the goods stand of which is rotatably arranged on the wheeled underframe. A serious disadvantage of this oven cart is that the whole cart has to be placed in the hot oven chamber during the baking which causes lubrication problems in bearings of the goods stand and the wheels. Another disadvantage is that the rotatability of the goods stand necessary during baking complicates the transportation of the oven cart when it is moved into or out of the oven. Even when the oven cart is outside of the oven, uneven floors, or sudden braking or acceleration easily causes the goods stand to rotate whereby the goods move around or even fall off.

German Pat. No. 2,616,329 shows a bakery oven that is divided into two separate chambers, an oven chamber for the goods stand of the oven cart and a chamber for its underframe. In order to achieve a more even heat distribution a metal hood is placed over the goods on each tray. The aim is that the warm air will flow between the hoods and the trays, so that an even heating of these and thereby an even heat distribution to the baking goods occur. For this reason it decided to place the cart underframe in a separate chamber, since otherwise the airflow in the lower part of the oven disturbs the heat distribution and the baking result decreases. In this type of oven it is therefore neither possible or desirable to rotate the goods stand.

SUMMARY OF THE INVENTION

The purpose of the invention is to provide a bakery oven and an oven cart which can be placed therein, where the advantages with the rotatable goods stand i.e. even heat distribution to all the trays is utilized without the cart underframe being exposed to disturbing heat effects. Another object is to provide an oven cart, that in all ways outside of the oven behaves as a conventional cart, where the goods stand is unrotatably fixed to the undersection, whereas when the oven cart is placed inside the oven it acts as a rotatable stand despite the fact that its underframe is stationary and placed in a chamber separated from the oven chamber.

This is achieved by the fact that the oven chamber communicates with the cart chamber via a slot which is open towards the oven door, for receiving a connection arrangement between the goods stand and the cart underframe, that a locking mechanism for locking the cart underframe relative to the material stand is arranged in the cart underframe, and that means for cooperation with the locking mechanism of the oven cart and for disconnecting the goods stand relative to the cart underframe is arranged in the cart chamber, when the oven cart is in the oven and the coupling member is connected to the driving means.

DESCRIPTION OF THE DRAWINGS

The invention will now be described with reference to some embodiments shown on the attached drawings wherein.

DETAILED DESCRIPTION

Figure 1:
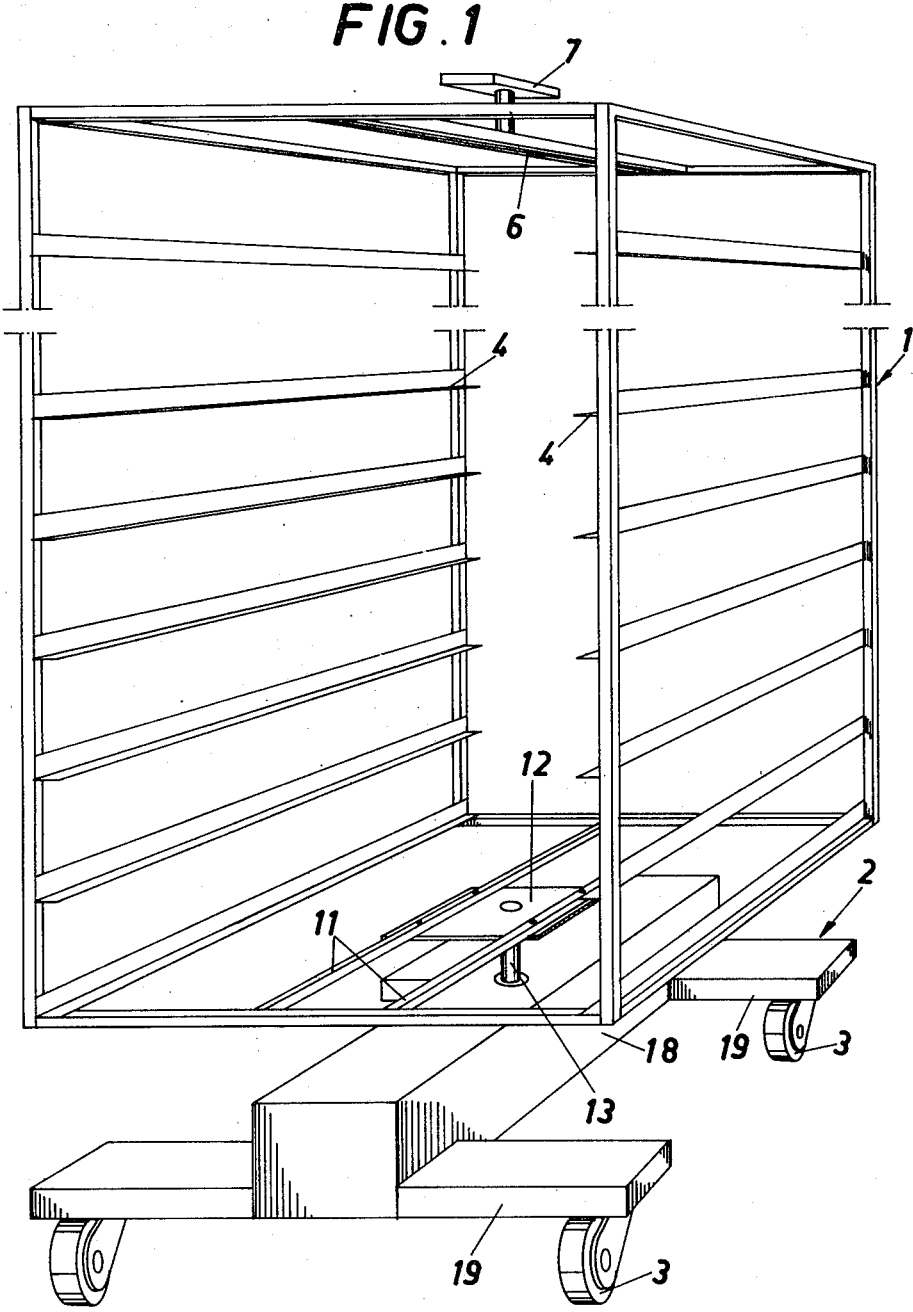
FIG. 1 is a perspective view of an oven cart according to the invention.

The oven cart comprises a goods stand 1 arranged to support trays, grills or the like on which the bakery goods are placed, and an underframe 2 provided with wheels 3. The goods stand 1 consists of a frame work, which along opposite sides is provided with supporting strips 4 for the trays or grills. The trays or grills with the goods therein are placed in the stand 1 and the oven cart is rolled into a bakery or roasting oven, which comprises an isolated oven chamber 5 which on the front is provided with a door (not shown).

Figure 2:
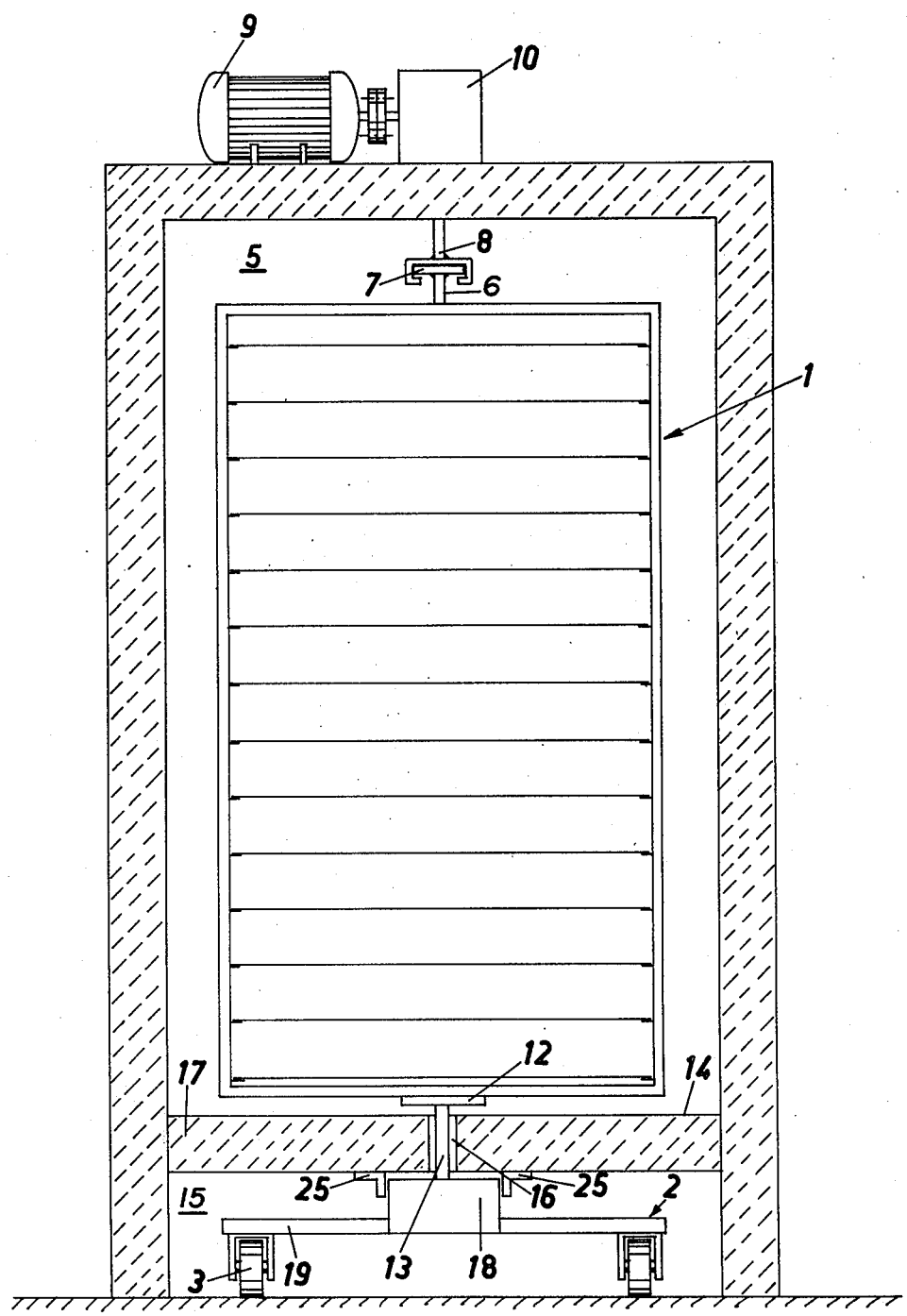
FIG. 2 is a vertical cross sectional view of a bakery oven according to the invention with an oven cart placed therein.

The goods stand 1 shown in FIGS. 1 and 2 is at the top provided with a longitudinal horizontal rail 6 on which a coupling member 7 is attached, which is intended to cooperate with a driving member 8 mounted above the oven and connected to a driving motor 9 through a gear mechanism 10. The goods stand 1 is rotatable about a vertical axial line relative to the underframe 2 and can be driven by the motor 9 to rotate inside the oven.

The goods stand 1 is at the bottom provided with two parallel longitudinal horizontal rails 11, to which a plate 12 is fixedly or removably attached. The plate 12 is attached to a vertically arranged axle 13, which is rotatably mounted on the underframe 2. The material stand 1 is thus supported on the underframe 2 by means of the axle 13 and the plate 12.

The oven has a space 15 arranged below the elevated floor 14 of the oven chamber 5, said space 15 being intended to receive the underframe 2 of the oven cart, which rests therein not moving while the goods stand 1 rotates in the heated oven chamber 5. The oven chamber floor 14 is provided with a slot 16, which is open towards the oven door, said axle 13 being received in said slot when the cart is rolled into the oven. The oven chamber floor 14 is provided with heat insulation 17 to reduce the heating of the cart chamber 15 and thereby protect heat sensitive parts of the underframe, especially the axle and wheel bearings.

Figure 3:
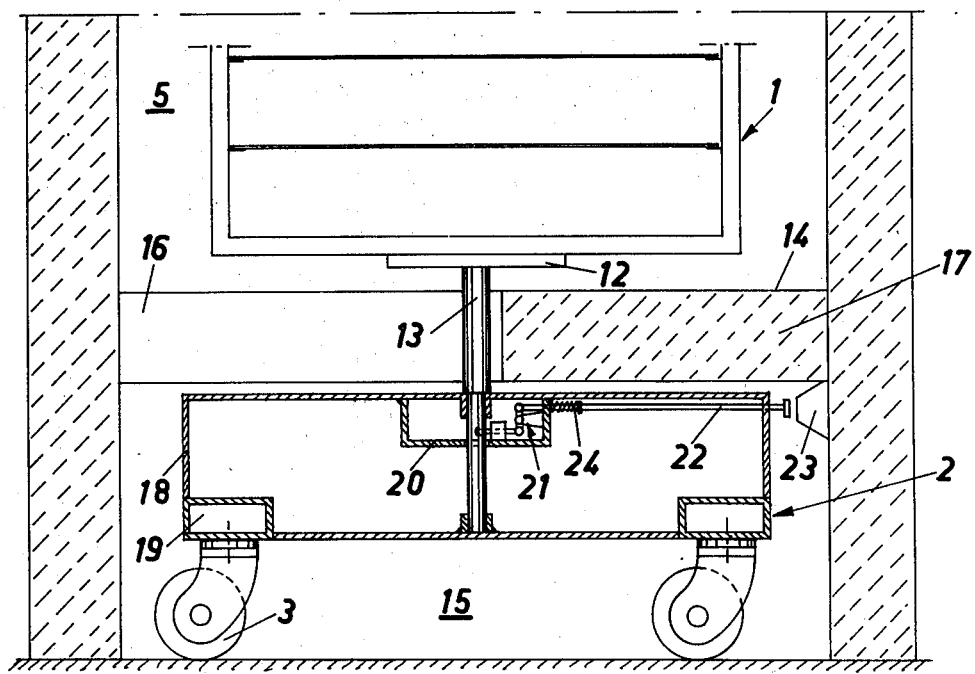
FIG. 3 is a vertical cross sectional view at right angles to that of FIG. 2 of the underframe of an oven cart according to the invention.

The underframe 2 consists of an elongated box-shaped part 18 arranged on two parallel transversal wheel-provided supporting profiles 19. A profile 20 is arranged in the box-shaped part 18, as shown in FIG. 3, encasing the upper bearing arrangement for the axle 13 as well as an arrangement 21 for locking the axle 13 against rotation relative to the underframe 2. Said locking arrangement 21 can for example be operated by means of a spring loaded rod 22. When the rod 22 is not actuated the locking arrangement locks the axle 13 against rotation, which is usually desired when the cart 1 is outside of the oven and when it is rolled in or out of the oven. In the rear wall of the cart chamber 15 a protruding part 23 is arranged, against which the rod 22 presses, when the cart is rolled into the oven. Thereby the locking arrangement 21 is disconnected and the axle 13 can rotate. The spring 24, that loads the rod 22 should be relatively weak, so that the disconnection of the locking arrangement 21 works smoothly. Said locking arrangement can of course be designed in a plurality of different ways.

On the roof of the cart chamber 15 (FIG. 2) guides 25 for the box-shaped part 18 of the underframe 2 are arranged for assisting the guiding of the cart into a position where the coupling member 7 is connected to the driving member 8 of the drive motor 9. Said guides 25 also provide a locking of the underframe 2 in the cart chamber 15. In the embodiment shown in FIG. 4 the guides 25 for the wheels 3 are arranged in the floor 26 of the cart chamber 15.

Figure 5:
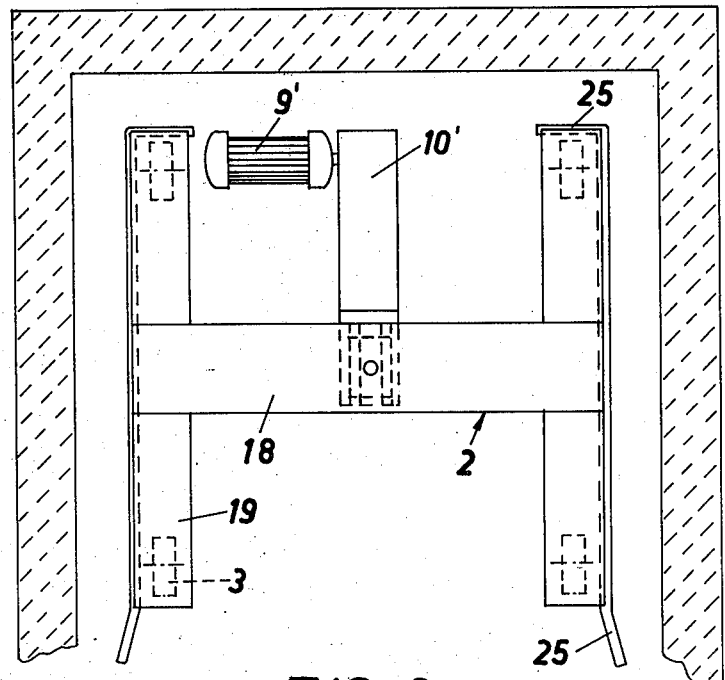
FIG. 5 is a cross sectional view taken along line V—V in FIG. 4.
Figure 4:
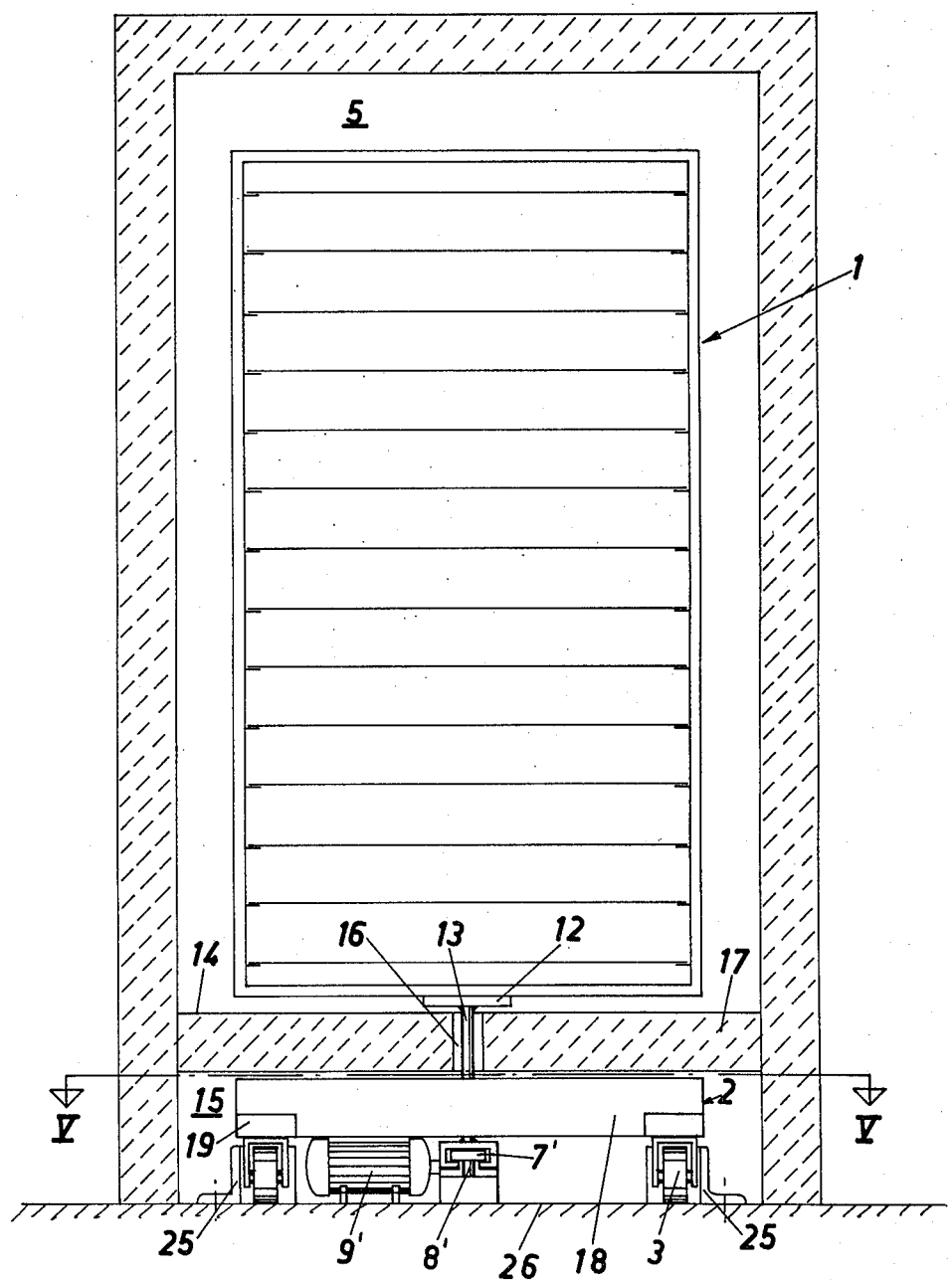
FIG. 4 is a cross sectional view similar to that of FIG. 2 showing another embodiment of a bakery oven an oven cart according to the invention.

According to the embodiment in FIGS. 4 and 5 the drive motor 9', the gear mechanism 10' and the driving member 8' are arranged in the cart chamber 15. The coupling member 7' is thereby arranged under the underframe 2 on the box-shaped part 18.

Figure 6:
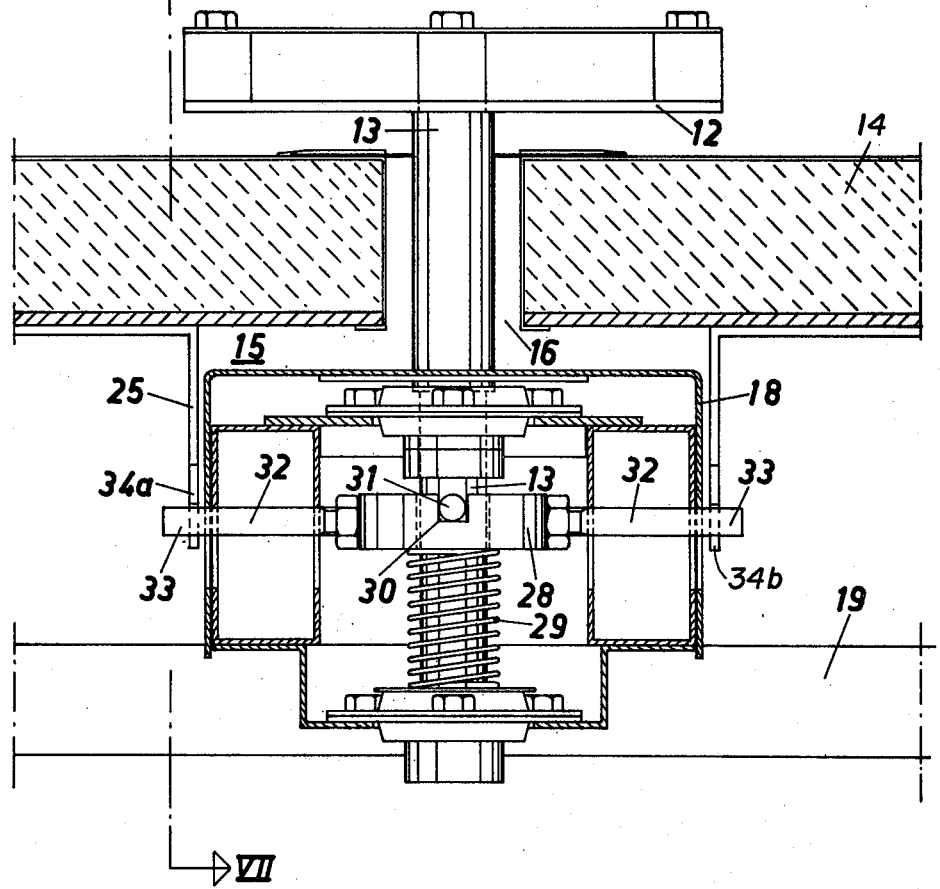
FIG. 6 shows on a larger scale a cross section through the bearing and locking arrangements of the undersection of another embodiment of the invention.
Figure 7:
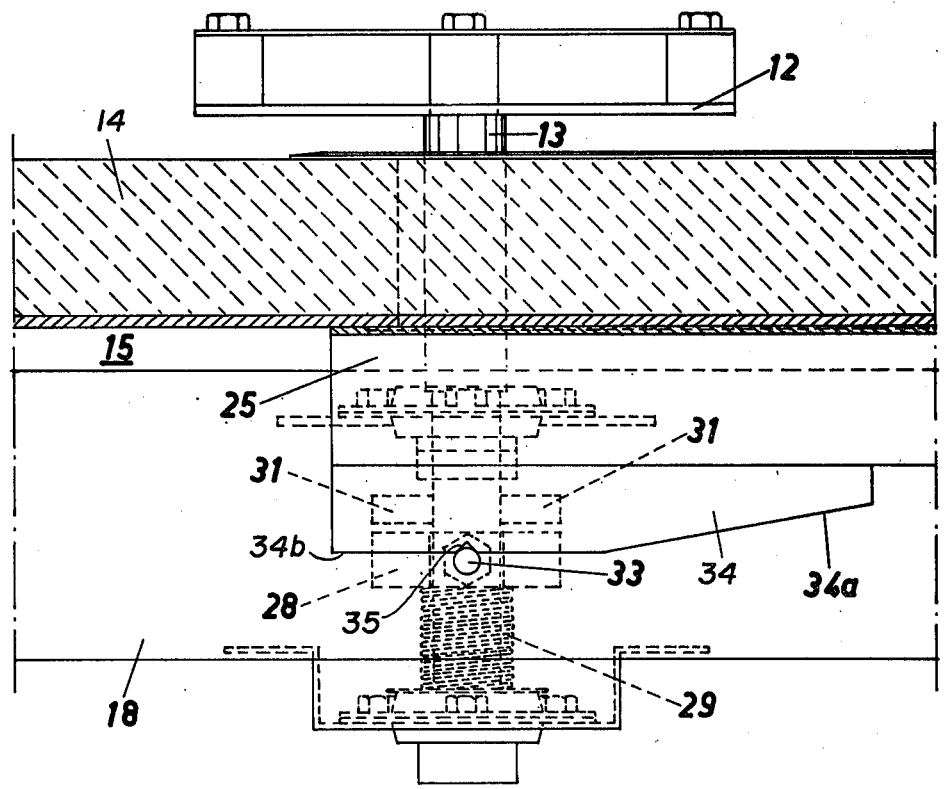
FIG. 7 shows a cross section taken along line VII—VII in FIG. 6.

The modified embodiment of the lock mechanism shown in FIGS. 6 and 7 comprises a stop plate 28, that against the action of a spring 29 is axially displaceable along the axle 13. The stop plate 28 is provided with two radial diametrically opposed recesses or grooves 30, which cooperate with a pin 31 extending through the axle 13. The stop plate 28 is perpendicular to the pin 31 provided with two protruding horizontal release members 32 in the form of bolts screwed into the stop plate 28, the free ends 33 of which are located outside the box-shaped part 18 of the underframe.

In the same way as in the embodiment shown in FIG. 2 guides 25 are arranged in the space 15, which simplify the guiding of the cart into the oven. The guides 25 are in this embodiment elongated and each is provided with a guiding member 34, which has a declined guiding surface portion 34a and a horizontal guiding surface portion 34b. The guiding members 34 are so placed in relation to the release member 32 of the oven carts that when the undersection is wheeled into the space 15 the ends of the release member 33 cooperate with said guiding surfaces so that during the placement of the oven cart into the oven an adjustment of the stop plate 28 against the action of the spring 29 occurs simultaneously, so that when the oven cart is positioned in the oven the pin 31 is free to rotate with axle 13 and thereby also the goods stand 1.

In order to achieve an exact positioning of the underframe relative to the coupling member 7 and the driving means 8 a positioning indicator is arranged in the horizontal guiding surface position 34b, said positioning indicator in the shown embodiment comprising a recess 35, into which the respective end 33 of the release members 32 can snap. This positioning indicator is a very important practical detail, since the person who manouvers the oven cart must on the one hand keep an eye on the connection of the coupling member 7 and the driving means 8 in the roof and on the other hand steer in the cart underframe into something that cannot be visually controlled, since the cart underframe is concealed by the oven chamber floor 14.

The invention is of course not limited to the shown embodiments but can be varied within the scope of the claims.

I claim:

1. An installation for preparing food of the type wherein a bakery oven has an oven chamber for receiving through a door in the oven an oven cart comprised of a goods stand rotatably mounted about a vertical axis on a wheeled cart underframe, a lower chamber under the oven chamber for receiving the wheeled cart underframe, a drive means and a drive coupling member rotatably driven by said drive means mounted on the oven, and a driven coupling member mounted on said goods stand for engagement with the drive coupling member, comprising a substantially vertical axle shaft rotatably connecting said goods stand to said cart underframe in spaced relation, a floor in said oven separating said oven chamber from said lower chamber, a slot in said floor open at the oven door end for receiving said axle shaft when said oven cart is moved into and out of the oven, a releasable locking mechanism mounted on said oven cart for locking said goods stand against rotation with respect to said cart underframe when said oven cart is outside the oven, and release means mounted on the oven for cooperatively engaging and releasing said locking mechanism when said oven cart is placed in position within the oven so that said goods stand can be rotated within the oven.

2. An installation according to claim 1 and further comprising guides mounted in the lower chamber for guiding the cart underframe to a connection position between said coupling members.

3. An installation according to claim 2 wherein said release means comprises a release member on said locking mechanism, a guiding surface on each guide arranged to cooperate with said release member, said guiding surface being provided with a positioning recess with which said release member engages when said goods stand is positioned in said connection position between said coupling members.

4. An installation as claimed in claim 3 wherein said locking mechanism comprises a stop plate displaceably mounted on said axle shaft, pins protruding from said axle shaft, grooves in said stop plate adapted to engage with said pins when in the locking position, said release member comprises at least one member extending from said stop plate non-rotatably into a position where it is engageable with said guiding surface, and a spring member urging said stop plate into a position where said grooves are engageable with said pins.

5. An installation as claimed in claim 2 wherein said locking mechanism comprises a recess in said axle shaft, a detent member mounted on said cart underframe for releasably engaging in said recess to prevent rotation of said axle shaft, a link member pivotably mounted on said cart underframe and connected at one end to said detent member, an elongated release member slidably mounted on said cart underframe connected at its inner end to the other end of said link member, spring means adapted to urge said release member into a position in which said detent member is engageable in said recess, and said release means comprises a member positioned to engage the outer end of said release member to displace it against the action of said spring means to disengage said detent member from said recess.

6. An installation as claimed in claim 1 wherein said drive means comprises a drive motor and a gear mechanism operably connected thereto.

7. An installation according to claim 6 wherein said drive motor, gear mechanism, drive coupling and driven coupling members are arranged in said lower chamber for the rotation of the goods stand.

* * * * *